(12) United States Patent
Haddadi

(10) Patent No.: US 8,128,462 B2
(45) Date of Patent: Mar. 6, 2012

(54) METHOD OF CENTERING A NON-EDGED OPHTHALMIC LENS IN WHICH THE CENTERING POINT OF THE LENS IS OFFSET RELATIVE TO ITS GEOMETRIC CENTER

(75) Inventor: Ahmed Haddadi, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1042 days.

(21) Appl. No.: 12/064,842

(22) PCT Filed: Jul. 13, 2006

(86) PCT No.: PCT/FR2006/001719
§ 371 (c)(1),
(2), (4) Date: Feb. 26, 2008

(87) PCT Pub. No.: WO2007/026058
PCT Pub. Date: Mar. 8, 2007

(65) Prior Publication Data
US 2008/0207092 A1 Aug. 28, 2008

(30) Foreign Application Priority Data
Aug. 31, 2005 (FR) ...................................... 05 08896

(51) Int. Cl.
*B24B 9/00* (2006.01)
(52) U.S. Cl. ......................................... 451/43; 451/256

(58) Field of Classification Search ..................... 451/43, 451/44, 256, 255, 5, 6
See application file for complete search history.

(56) References Cited

U.S. PATENT DOCUMENTS
4,945,684 A * 8/1990 Wada et al. ........................ 451/5
6,607,271 B2 * 8/2003 Bar et al. ....................... 351/178

FOREIGN PATENT DOCUMENTS
FR 2 807 169 A1 10/2001

OTHER PUBLICATIONS
Dec. 20, 2006 International Search Report in corresponding PCT/FR2006/001719.

* cited by examiner

*Primary Examiner* — Robert Rose
(74) *Attorney, Agent, or Firm* — Young & Thompson

(57) ABSTRACT

The invention relates to a method of centering a single vision non-edged ophthalmic lens (1) possessing an initial outline (2) associated with a centering point (CO) and that is to be shaped (edged) to take up a final outline (3) associated with a pupil point, the method comprising the steps of: superposing the pupil point of the final outline on the centering point of the non-edged lens; and adjusting the relative position of the final outline to fit within the initial outline of the non-edged lens. The step of adjusting the position of the final outline to fit within the initial outline includes angularly orientating the initial outline relative to the final outline about the centering point in compliance with an adjustment angular position to avoid or reduce any protrusion of the final outline beyond the initial outline of the lens.

12 Claims, 1 Drawing Sheet

Figure 1:
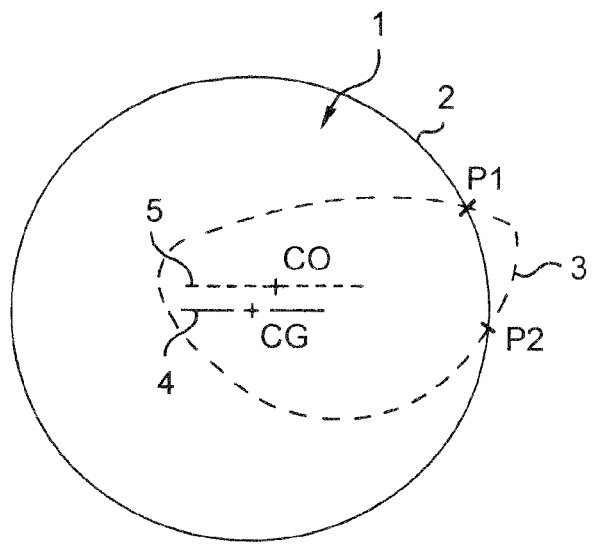

METHOD OF CENTERING A NON-EDGED OPHTHALMIC LENS IN WHICH THE CENTERING POINT OF THE LENS IS OFFSET RELATIVE TO ITS GEOMETRIC CENTER

TECHNICAL FIELD TO WHICH THE INVENTION RELATES

The present invention relates in general to the field of eyeglasses and more particularly to mounting ophthalmic lenses for a pair of correcting eyeglasses on a frame.

More particularly, the invention relates to a method of centering a single vision non-edged ophthalmic lens possessing an initial outline associated with a centering point and that is to be shaped to take up a final outline associated with a pupil point, the method comprising the steps of: superposing the pupil point of the final outline on the centering point of the non-edged lens; and adjusting the relative position of the final outline to fit within the initial outline of the non-edged lens.

A particularly advantageous application of the invention lies in centering lenses of low power.

TECHNOLOGICAL BACKGROUND

The technical portion of the work of an optician consists in mounting a pair of ophthalmic lenses on a frame that has been selected by the wearer. This mounting comprises two main operations:
- centering each lens, which consists in positioning and orienting the lens appropriately in front of the eye of the future wearer, and thus relative to the frame; and then
- shaping (edging) each lens by machining or cutting its outline to the desired shape, given the defined centering parameters.

In the context of the present invention, attention is given to the first operation of centering. Specifically, the optician needs to define the position that the ophthalmic lens is to occupy in the optical frame of reference (typically conventional marks or a centering point), before the lens is shaped to have the final shape it needs to present after shaping, so that the lens will be suitably positioned in front of the corresponding eye of the wearer and will perform the optical function for which it is designed as well as possible.

For this purpose, the optician initially situates the position of the pupil of each eye on the corresponding lens. This serves mainly to determine two parameters that are associated with the morphology of the wearer, namely the pupillary distance or the two half-distances defined as the distances between the pupils of the two eyes and the nose of the wearer, and also the height of the pupils relative to the final outline.

Thereafter, the optician transfers the height as measured in this way onto the non-edged lens, starting from the position of the centering point of the lens as previously identified and that is to be positioned in register with the pupil of the wearer. This transferred height, together with the corresponding pupillary half-distance, then enables the lens to be centered, i.e. positioned appropriately on the frame, and thus enables the final outline to be positioned on the lens.

Nevertheless, it can happen that the final outline protrudes beyond the outline of the non-edged lens, making it impossible to perform a shaping operation to match the intended outline.

In order to remedy this problem, the optician at present acts manually to offset the centering point away from the point that is to come into register with the pupil of the wearer, referred to as the pupil point. This operation enables the entire final outline to be brought within the initial outline of the non-edged lens, however it reduces the optical effectiveness of the lens and it also reduces the visual comfort provided by giving rise to uncontrolled prismatic effects.

OBJECT OF THE INVENTION

An object of the present invention is to propose a centering method that makes it possible to avoid or at least reduce any offset of the centering point away from the pupil point.

More particularly, the invention proposes a centering method as defined in the introduction, in which provision is made for the step of adjusting the position of the final outline to fit within the initial outline to include angularly orienting the initial outline relative to the final outline about the centering point in compliance with an adjustment angular position to avoid or reduce any protrusion of the final outline beyond the initial outline of the lens.

Thus, by means of the invention, the centering point and the pupil point continue to coincide at the end of this step. The optical characteristics of the lens are thus preserved and the comfort of the lenses remains at its best for the wearer. Advantage is being taken here of the fact that the initially-observed impossibility of shaping the lens to match the desired shape often occurs when there is an offset between the geometrical center of the non-edged lens and its centering point. It will be understood that as a result of this offset, pivoting the desired final outline relative to the non-edged lens about the centering point might well reveal an angular position in which the final outline lies completely within the initial circular outline of the non-edged lens. When no such position exists, the best angular position is retained, i.e. the position for which the desired shape protrudes as little as possible from the non-edged lens.

The non-edged lens preferably has zero prismatic optical power and a geometrical center that is distinct from the centering point.

According to a first advantageous characteristic of the method in accordance with the invention, if it is not possible to avoid the final outline protruding beyond the initial outline of the non-edged lens, then the angular orientation of the initial outline relative to the final outline is calculated to minimize the extent to which the final outline protrudes beyond the initial outline of the lens.

Thus, if no angular position exists in which the final outline is contained within the initial outline of the non-edged lens, this calculation makes it possible to deduce the angular position for the final outline in which it protrudes the least beyond the initial outline of the non-edged lens. This angular position for the final outline can then be selected as being the starting position for offsetting the pupil point relative to the centering point in manual, or automatic, or manually-assisted manner, so as to force the final outline to enter within the initial outline. Consequently, by deducing this angular position for the final outline it is possible to reduce the offset to a minimum value, regardless of whether offsetting is performed manually or automatically or with manual assistance.

Otherwise, and advantageously, if there exists a position in which the final outline is contained within the initial outline, the angular orientation of the initial outline relative to the final outline is calculated to maximize the shortest distance between the final outline and the initial outline, or at least to make it greater than a predefined threshold.

Thus, if there are a plurality of angular positions in which the final outline is contained within the initial outline of the non-edged lens, this calculation makes it possible to find the angular position for the final outline in which the greatest possible value is obtained for the minimum spacing between the final outline of the lens after shaping and the initial outline of the non-edged lens (or a value that is at least greater than a predefined threshold). This gives the resulting configuration a margin for maneuver should it be appropriate subsequently to offset the final outline relative to the initial outline (i.e. to offset the centering point) because of other considerations.

It can happen that the lens presents a defect or a chip close to the final outline of the lens. It can then be desirable to offset the centering point relative to the pupil point so as to take the defect or chip outside the final outline, so that once it has been shaped the final lens is free of the defect or chip. Moving the defect or chip out from the final outline can also be achieved by additional relative pivoting of the final outline relative to the initial outline (or vice versa), where such pivoting is possible because some spacing is preserved between the final outline and the initial outline.

The subsequent offsetting of the final outline relative to the initial outline may also be desired in order to achieve an identical offset for the left and right lenses in the event that the other lens in the pair to which the lens being centered belongs needs to have its centering point offset. According to another advantageous characteristic of the method in accordance with the invention, for a non-edged lens presenting non-zero cylindrical optical power, the adjustment angular position is selected from two the positions that are 180 degrees apart and that correspond to the cylindrical prescription for the non-edged lens.

Thus, when such a lens is prescribed for its wearer with a certain orientation for one of its axes relative to the horizontal plane, the method takes advantage of the fact that the prescription allows the lens to be positioned in two positions in which firstly the centering point and the pupil point coincide and secondly the prescription for the orientation of one of its axes is satisfied. The method thus explores these two possible positions for the final outline on the non-edged lens in order to determine whether the final outline fits within the initial outline of the non-edged lens, at least in one of those positions.

According to another advantageous characteristic of the method of the invention, the adjustment angular position for the final outline is determined by pivotal adjustment of the final outline about the centering point.

Advantageously, for a non-edged lens presenting zero cylindrical optical power, the pivotal adjustment of the final outline about the centering point is performed incrementally.

Thus, advantage is taken of the characteristic whereby a lens that presents spherical optical power as its only optical power can be positioned in any angular position about its centering point. So long as the pupil point and the centering point coincide, any variation in the angular position of such a lens about its centering point does not change its refractive characteristics.

Advantageously, the incrementation of the pivotal adjustment of the final outline is then performed degree by degree.

In a variant implementation of the invention, the method includes the following additional steps, prior to the step of adjusting the position of the final outline to fit within the initial outline:
calculating firstly the greatest radius between the centering point and the initial outline, and secondly the greatest radius between the pupil point and the final outline;
comparing the greatest radii; and
deducing whether the adjustment step is feasible.

Thus, these additional and successive steps make it possible to determine whether there exists a position for the final outline relative to the non-edged lens in which, firstly the pupil point coincides with the centering point, and secondly the final outline is contained within the initial outline of the non-edged lens.

In a variant implementation of the invention, the method includes the following additional steps prior to the step of adjusting the position of the final outline to fit within the initial outline:
identifying firstly the angular position of the greatest radius between the centering point and the initial outline, and secondly the angular position of the greatest radius between the pupil point and the final outline; and
deducing the optimum adjustment angular position for the final outline on the non-edged lens.

Advantageously, for the non-edged lens presenting non-zero cylindrical optical power, the step of superposing the pupil point on the centering point is accompanied by a step of orienting the cylinder axis of the lens in compliance with the prescribed axis for its cylindrical power, said step of orienting the cylinder axis preceding and being distinct from the adjustment step.

DETAILED DESCRIPTION OF AN IMPLEMENTATION

The following description with reference to the accompanying drawing given by way of non-limiting example, shows clearly what the invention consists in and how it can be implemented.

Figure 2:
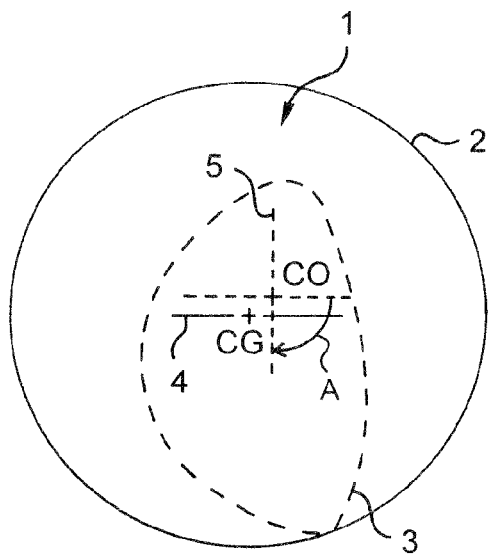
Figure 3:
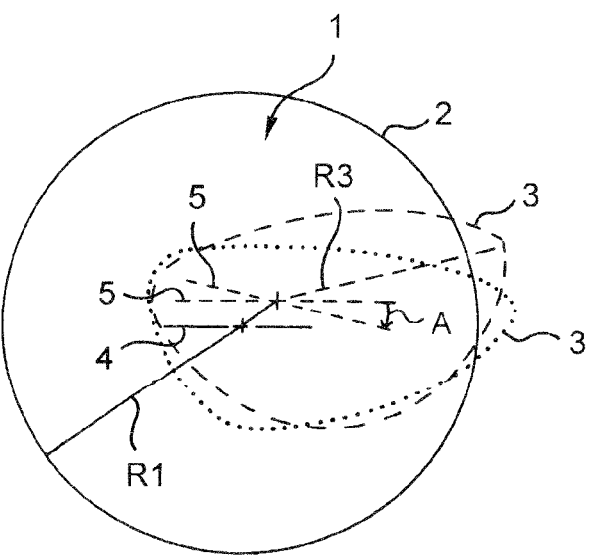

In the accompanying drawing:

FIGS. 1 and 2 are diagrammatic front views showing a non-edged lens, its final outline, and points characteristic of the centering method of the invention; and FIG. 3 is a diagrammatic front view showing a non-edged lens, its final outline, and points characteristic of a variant implementation of the centering method.

To implement the method, it is necessary to have means available that are themselves well known to the person skilled in the art. These means do not themselves form part of the invention described.

Amongst such well-known means, it is possible to use an automatic or manually-assisted device for detecting characteristics of an ophthalmic lens, as described in patent FR 2 825 466 or as sold by Essilor International under the trademark Kappa or under the trademark Kappa CT. It is also possible to use an outline reader appliance as described in patent EP 0 750 172 or as sold by Essilor International under the trademark Kappa or Kappa CT.

A particularly advantageous application for implementing the method of the invention lies in incorporating a program in software integrated in a machine provided with a processor unit and a monitor screen, which program is suitable for executing the steps of the centering method as described.

The optical correcting power of a correcting ophthalmic lens is defined by its spherical, cylindrical, and prismatic refringence properties. It will be understood that such an optical definition is of a scope that is more general than a definition of surfaces only: it defines the overall refringence effect of the lens on an incident light ray, which results from the algebraic sum of the refringences imparted successively by both the front and the rear faces of the lens. It will be understood that such an optical definition covers a plurality, or even an infinity, of combinations of pairs of surfaces producing the same overall optical refringence effect, as explained in the document "Theoretical aspects of concentric varifocal lenses" by W. N. Charman, in Opthal. Physiol. Opt., Vol. 2, No. 1, pp. 75-86, 1982, published by Pergamon Press for the British College of Ophthalmic Opticians.

Among these refringence properties, the first to be defined is the "spherical refringence" power of a lens for an incident beam passing through the lens (also known as the total power or refringent power or focusing power or spherical optical power). It is defined as the magnitude that characterizes and quantifies the primary effect of spherical refringence ("magnifying glass" effect) of the lens on the beam under consideration: if it is positive, the lens has a converging effect on the beam; if it is negative, the effect on the beam is diverging. The point of the lens where the magnifying glass effect is zero (i.e., for a lens having optical power that is purely spherical, the point where the incident ray and the transmitted ray have the same axis) is known as the optical center.

The term "cylindrical refringence power" of a lens is defined, for an incident ray passing through the lens (also known as the cylindrical optical power), as being the magnitude that characterizes and quantifies the cylindrical refringence effect exerted by the lens on the ray under consideration, whereby not one but two focal areas are formed that are situated in different planes, which focal areas are generally mutually perpendicular and referred to as the tangential focus and the sagittal focus. This cylindrical power, also known as "astigmatism power" or merely as "astigmatism", corresponds to the difference between the spherical powers associated with the two focal areas. The two areas are identified by an axis passing through their "optical centers" and commonly referred to as the cylinder axis.

Finally, the "prismatic refringence power" of a lens is defined, for an incident ray passing through the lens (also known as the prismatic optical power), as being the magnitude that characterizes and quantifies the prismatic refringence effect, or more simply the deflection exerted by the lens on the ray under consideration. This prismatic power, also known as "prism", corresponds to the angle through which the ray is deflected, i.e. the angle formed between the entry and exit portions of the ray. The prism is made up of two components: a horizontal component referred to as the "horizontal prism" corresponding to the angle formed between the protrusions of the incoming and outgoing portions of the ray onto a horizontal plane, and a vertical component, referred to as the "vertical prism" corresponding to the angle formed between the protrusions of the incoming and outgoing portions of the ray onto a vertical plane.

In practice, the optician places a non-edged lens 1 having front and rear faces of shape that determine its optical powers for the purpose of correcting defects in the eye of a wearer. The non-edged lens 1 presents an initial outline 2 of shape that is known and generally circular, and a geometrical center CG of known position. In this example, the non-edged lens 1 is circular in shape, so the geometrical center CG corresponds to the center of the circle described by the lens. This non-edged lens 1 presents a prescribed prismatic optical power (e.g. at the centering point) that is zero. It is also a single vision lens. Its centering point CO and its optical center consequently coincide. Finally, the position of the non-edged lens 1 is identified in two dimensions by its centering point CO and by a virtual position-identifying line 4 serving to identify its angular position about its centering point CO.

The position of its centering point CO, which in general is not the same as its geometrical center CG, and the position of its virtual position-identifying line 4 can be detected by various techniques as a function of the equipment available to the optician. For example, the technique may be of the deflection measurement, interference measurement, or image processing type. This can be done by using an automatic device for detecting characteristics of an ophthalmic lens, as described in patent FR 2 825 466. An example of such an appliance is that sold by Essilor International under the trademark Kappa or Kappa CT. The technique used also serves to determine the values of the optical powers of the lens, and when its cylindrical optical power is not zero, the orientation of its cylinder axis relative to its virtual position-identifying line 4.

The optician begins by having the future wearer of eyeglasses select the final outline 3 to be presented by the lenses. This is done by choosing eyeglasses from amongst presentation eyeglasses in the possession of the optician. In a variant, the selection may be performed from a database register.

Once the selection has been made, the optician acquires the shape of the inner outline of each of the rims of the selected frame by using an outline reader appliance of the kind described in patent EP 0 750 172. The position of a horizon line 5 for the frame is stored together with the shape of the inner outlines of the rims of the frame so as to enable its orientation to be identified. An example of such an appliance is that sold by Essilor International under the trademark Kappa or Kappa CT. Knowledge of this shape makes it possible to determine the shape of the final outline 3 to be given to the ophthalmic lens once it has been shaped.

The optician needs to identify the position of the pupil point relative to the selected final outline 3 in such a manner that the lens is properly positioned in front of the pupil of the wearer's eye. For this purpose, the optician places presentation eyeglasses on the wearer having a frame that is identical to that selected by the wearer, and then marks manually on each of the lenses the pupil point corresponding to the point that is to be positioned in front of the pupil of the wearer's eye. The optician thus identifies the position of the pupil point relative to the final outline 3.

In a variant, the optician can perform this operation with the help of image acquisition and recognition software that identifies the pupil point from a digital photograph of the face of the wearer wearing the presentation eyeglasses. The software thus acquires directly the position of the pupil point and of the horizon line 5 relative to the final outline 3.

At this stage, the processing software has stored in its memory the characteristics of the non-edged lens 1 (its initial outline 2, its centering point CO, possibly its geometrical center CG, and its optical powers, in particular its spherical and cylindrical powers, together with the angular orientation of the cylinder axis of its cylindrical power, if any) together with the characteristics of the final outline 3 (its shape, the position of the pupil point, and the position of the horizon line 5).

The processing software then runs a step of superposing the pupil point on the centering point CO of the non-edged lens 1 by virtually positioning the final outline 3 on the initial outline 2 of the non-edged lens.

If the non-edged lens 1 presents cylindrical power of zero, then this positioning is performed in such a manner that the horizon line 5 of the final outline 3 is parallel to the position-identifying line 4 of the non-edged lens 1.

In contrast, if the non-edged lens 1 presents non-zero cylindrical optical power, this positioning is performed in such a manner that the orientation of the cylinder axis of the non-edged lens 1 relative to the horizon line 5 of the final outline 3 corresponds to the orientation prescribed for the wearer.

As shown in FIGS. 1 and 2, once this operation has been performed, the processing software runs a step of adjusting the position of the final outline 3 to be inside the initial outline 2 of the non-edged lens 1.

To do this, the software searches for the presence of any point of intersection P1, P2 between the initial outline 2 of the non-edged lens 1 and the final outline 3.

If the software does not detect any point of intersection, then the non-edged lens 1 is shaped directly in this initial angular position of the final outline 3, thereby directly constituting the adjustment angular position in the meaning of the present invention.

In contrast, if two points of intersection P1, P2 are found to exist, the software performs pivotal adjustment of the final outline 3 about the centering point CO through an adjustment angle A.

When the ophthalmic lens presents zero cylindrical power, the software performs pivotal adjustment through an adjustment angle A that is equal to one degree, for example. It then searches again to see whether two points of intersection P1, P2 are present. So long as two points of intersection P1, P2 are present, the software reiterates the pivotal adjustment of the final outline 3 and the search for the points of intersection P1, P2.

When the processing software no longer finds any point of intersection P1, P2 it freezes the final outline 3 of the non-edged lens 1 in the angular position as defined in this way, ready for shaping.

In a variant, the software need not stop at the first angular orientation it finds for which the final outline 3 comes within the initial outline 2, but may on the contrary continue its search over one complete revolution in order to determine the relative angular orientation for the final and initial outlines for which the shortest distance between the final outline and the initial outline is either at its maximum, or else is at least greater than a predefined threshold.

It is also possible, for the same purpose, to implement one complete revolution of the final outline 3 so as to determine the angular position of the final outline 3 that is equidistant between two angular positions in which the final outline 3 and the initial outline 2 are tangential. To do this, it is necessary to identify firstly the angular position of the final outline 3 in which it comes for the first time within the initial outline 2, and secondly the angular position of the final outline 3 in which it again protrudes from the initial outline 2, with the angular position of the final outline 3 then being calculated to be equidistant between these two angular positions.

In contrast, if after one complete revolution of the final outline 3, the software still has not found any position of the final outline 3 for which there is no point of intersection P1, P2, then the software displays a warning message on the monitor screen for the attention of the optician. The positioning of the final outline 3 is then modified either automatically or manually, in known manner, by moving the position of the centering point CO away from the position of the pupil point so as to force the final outline 3 to come within the initial outline 2.

If it is not possible to avoid having the final outline 3 protruding beyond the initial outline 2, then the adjustment angular position of the final outline 3 is calculated so as to minimize the extent to which the final outline 3 protrudes beyond the initial outline 2 of the lens. This calculation is performed, after each pivotal adjustment operation, by comparing the positions of the two points of intersection P1 and P2, and by identifying the angular position of the final outline 3 for which the two points P1 and P2 are the closest together. This position is the position that minimizes the extent to which the final outline 3 protrudes beyond the initial outline 2.

When the ophthalmic lens presents non-zero cylindrical power, the software performs a pivotal adjustment operation through an adjustment angle A that is equal to 180 degrees. It then searches again for the presence of two points of intersection P1, P2. If it does not detect any, then the software freezes the final outline 3 on the non-edged lens 1 in this position, ready for shaping. However, if it does detect points of intersection, an automatic adjustment operation on the positioning of the final outline 3 relative to the initial outline 2 is performed (manually or with manual assistance) by offsetting the centering point CO away from the pupil point so as to force the final outline 3 to come within the initial outline 2.

FIG. 3 shows a variant implementation of the centering method in which, prior to the step of adjusting the position of the final outline 3 to within the initial outline 2, the software calculates the values and identifies the angular positions both of the greatest radius R1 between the centering point CO and the initial outline 2, and of the greatest radius R3 between the pupil point and the final outline 3.

This variant implementation is performed by the processing software only on ophthalmic lenses that present prismatic and cylindrical powers that are both zero.

At the end of this calculation and position identification, the software compares the values of the two greatest radii R1, R3.

If the greatest radius R1 presents a value that is less than that of the greatest radius R3, then the software displays a warning message on the monitor screen informing the optician that the position of the final outline 3 needs to be adjusted relative to the initial outline 2 by offsetting the centering point CO away from the pupil point, either manually or by using some other automatic or manually-assisted method.

After this comparison, and whatever its result, the software determines the optimum orientation for the final outline 3 relative to the initial outline 2 so that the final outline is best positioned relative to the initial outline 2 of the non-edged lens 1. This optimum adjustment of the position of the final outline 3 corresponds, for example, to the angular position of the final outline 3 in which the two greatest radii R1, R3 are superposed. This optimum orientation of the final outline 3 is the most suitable for causing the final outline 3 to come within the initial outline 2.

Once the final outline 3 has been positioned in this way, the software verifies whether the entire final outline 3 lies within the initial outline 2.

If so, the lens is shaped with the final outline 3 in this position. This position presents the advantage of maximizing the shortest distance between the final outline 3 and the initial outline 2.

In contrast, if not, i.e. if the final outline 3 protrudes beyond the initial outline 2, this position for the final outline 3 is taken as being a starting position for the optician to perform manual or automatic or manually-assisted offsetting of the centering point CO away from the pupil point so as to force the final outline 3 to enter into the initial outline 2. This position presents the advantage of minimizing the extent to which the final outline 3 protrudes beyond the initial outline 2. The manual offset needed to bring the final outline 3 into the initial outline 2 is then at its minimum possible value.

In another variant implementation of the centering method of the invention, after the step of superposing the pupil point on the centering point CO, the software positions the final outline 3 directly on the ophthalmic lens 1 at the position that is best adapted to shaping the lens.

In this variant implementation, the ophthalmic lens in question likewise presents a prismatic power of zero.

To begin with, the software calculates the value and identifies the angular position of the greatest radius R3 between the pupil point and the final outline 3.

Then, if the lens presents a cylindrical optical power of zero, the software calculates the value and identifies the angular position of the greatest radius R1 between the centering point and the initial outline 2. However if the lens presents cylindrical optical power that is not zero, then the software calculates the value and identifies the angular position of the greater of the radii R1 between the centering point and the initial outline 2 and coinciding with the cylinder axis.

At the end of these calculation and position-identifying operations, the software compares the values of these two greatest radii R1, R3.

If the greatest radius R1 presents a value less than or too close to the value of the greatest radius R3 (e.g. the two radii present a difference of a few tenths of only a millimeter, typically two- to three-tenths of a millimeter, then the software displays a message on the monitor screen informing the optician that it is necessary to adjust the final outline 3 manually (or using any other automatic or manually-assisted method) relative to the initial outline 2 by offsetting the centering point CO away from the pupil point.

In contrast, if the greatest radius R1 presents a value greater than that of the greatest radius R3, preferably plus a margin of a few tenths of a millimeter, then the software informs the optician that the final outline 3 can be positioned within the initial outline 2 by using the present centering method.

Then, whatever the result of the comparison, the software positions the final outline 3 directly relative to the initial outline 2 in such a manner that the pupil point and the centering point of the ophthalmic lens 1 coincide and the two greatest radii R1, R3 are superposed.

With the final outline 3 thus positioned in this adjustment angular position, the software verifies whether the final outline 3 lies within the initial outline 2. If so, the lens is shaped (edged) using this position for the final outline 3. This position has the advantage of maximizing the shortest distance between the final outline 3 and the initial outline 2.

However, if this is not so and the final outline 3 protrudes beyond the initial outline 2, this position for the final outline 3 is taken as a starting position for performing pivotal adjustment of the final outline 3 about the centering point CO of the kind described for the first implementation.

If, after the final outline 3 has been turned through one complete revolution with the software not finding any position for the final outline 3 in which it does not project beyond the initial outline, then the software displays a warning message on the monitor screen informing the optician that it is necessary to adjust the final outline 3 manually (or using any other automatic or manually-assisted method) relative to the initial outline 2 by offsetting the centering point CO away from the pupil point.

The present invention is not limited in any way to the implementations described and shown, and the person skilled in the art can apply any variant thereto in accordance with the spirit of the invention.

The invention claimed is:

1. A method of centering a single vision non-edged ophthalmic lens possessing an initial outline associated with a centering point and that is to be shaped to take up a final outline associated with a pupil point, the method comprising the steps of:
   superposing the pupil point of the final outline on the centering point of the non-edged lens; and
   adjusting the relative position of the final outline to fit within the initial outline of the non-edged lens;
   wherein the step of adjusting the position of the final outline to fit within the initial outline includes angularly orientating the initial outline relative to the final outline about the centering point in compliance with an adjustment angular position to avoid or reduce any protrusion of the final outline beyond the initial outline of the lens.

2. A method according to claim 1, in which the non-edged lens has zero prismatic optical power.

3. A method according to claim 1, in which the non-edged lens has a geometrical center distinct from the centering point.

4. A method according to claim 1, in which, if it is not possible to avoid the final outline protruding beyond the initial outline of the non-edged lens, then the angular orientation of the initial outline relative to the final outline is calculated to minimize the extent to which the final outline protrudes beyond the initial outline of the lens.

5. A method according to claim 1, in which, if there exists a plurality of angular positions in which the final outline is contained within the initial outline, the angular orientation of the initial outline relative to the final outline is selected such that the shortest distance between the final outline and the initial outline is maximum, or at least to make it greater than a predefined threshold.

6. A method according to claim 1, in which, for the non-edged lens presenting non-zero cylindrical optical power, the adjustment angular position is selected from two positions that are 180 degrees apart and that correspond to the cylindrical prescription for the non-edged lens.

7. A method according to claim 1, in which the adjustment angular position for the final outline is determined by means of pivotal adjustment of the final outline about the centering point.

8. A method according to claim 7, in which, for the non-edged lens presenting zero cylindrical optical power, the pivotal adjustment of the final outline about the centering point is performed incrementally.

9. A method according to claim 8, in which the incrementation of the pivotal adjustment of the final outline is performed degree by degree.

10. A method according to claim 1, including the following additional steps, prior to the step of adjusting the positions of the final outline to fit within the initial outline:
    calculating firstly the greatest radius between the centering point and the initial outline, and secondly the greatest radius between the pupil point and the final outline; comparing the greatest radii; and
    deducing whether the adjustment step is feasible.

11. A method according to claim 1, including the following additional steps prior to the step of adjusting the position of the final outline to fit within the initial outline:
    identifying firstly the angular position of the greatest radius between the centering point and the initial outline, and secondly the angular position of the greatest radius between the pupil point and the final outline; and
    deducing the optimum adjustment angular position for the final outline on the non-edged lens.

12. A method according to claim 1, in which, for the non-edged lens presenting non-zero cylindrical optical power, the step of superposing the pupil point on the centering point is accompanied by a step of orienting the cylinder axis of the lens in compliance with the prescribed axis for its cylindrical power, said step of orienting the cylinder axis preceding and being distinct from the adjustment step.

* * * * *